(12) United States Patent
Yitzhaki

(10) Patent No.: US 10,036,415 B2
(45) Date of Patent: Jul. 31, 2018

(54) HOOK APPARATUS AND METHODS OF USING THE SAME

(71) Applicant: Refael Yitzhaki, Des Plaines, IL (US)

(72) Inventor: Refael Yitzhaki, Des Plaines, IL (US)

( * ) Notice: Subject to any disclaimer, the term of this patent is extended or adjusted under 35 U.S.C. 154(b) by 0 days.

(21) Appl. No.: 15/193,650

(22) Filed: Jun. 27, 2016

(65) Prior Publication Data
US 2017/0370401 A1    Dec. 28, 2017

(51) Int. Cl.
*F16B 45/00* (2006.01)
*A44B 15/00* (2006.01)

(52) U.S. Cl.
CPC .............. *F16B 45/00* (2013.01); *A44B 15/00* (2013.01)

(58) Field of Classification Search
CPC .................................. F16B 45/00; A44B 15/00
USPC ...... 294/26, 137, 169; 16/413, 422; 4/246.1; 30/159
See application file for complete search history.

(56) References Cited

U.S. PATENT DOCUMENTS

| | | | | |
|---|---|---|---|---|
| 4,364,592 A | * | 12/1982 | Jackson | B65G 7/12 294/169 |
| 4,788,893 A | * | 12/1988 | Sutton | B25B 9/00 294/26 |
| 4,971,375 A | * | 11/1990 | Grecco | E05B 1/0053 16/426 |
| 5,029,921 A | * | 7/1991 | Houghton | A01M 31/00 294/137 |
| 5,083,825 A | * | 1/1992 | Bystrom | A45F 5/1046 294/171 |
| 5,090,691 A | * | 2/1992 | Pollock | A63B 21/151 16/426 |
| 5,199,758 A | * | 4/1993 | Howell | A45F 5/1046 294/153 |
| 5,201,559 A | * | 4/1993 | Boring | B25B 27/04 294/210 |
| 5,217,240 A | * | 6/1993 | Gardenhour, Jr. | A63H 33/00 280/282 |
| 5,540,468 A | * | 7/1996 | Fassman | E05B 1/0053 224/162 |
| 6,447,033 B1 | * | 9/2002 | Konczak | B65G 7/12 294/15 |
| 6,751,827 B1 | * | 6/2004 | Fok | E05B 1/0053 16/412 |
| D623,489 S | * | 9/2010 | Powell | D8/14 |
| D624,801 S | * | 10/2010 | Radloff | D8/308 |
| 7,938,464 B1 | * | 5/2011 | Hielm | A61F 4/00 16/413 |

* cited by examiner

*Primary Examiner* — Paul T Chin
(74) *Attorney, Agent, or Firm* — Scherrer Patent & Trademark Law, P.C.; Stephen T. Scherrer; Monique A. Morneault

(57) ABSTRACT

A hook apparatus comprises a loop structural element having a hook element extending therefrom that may be used for alternatively pushing, pulling, twisting, grabbing, holding or otherwise manipulating other objects without contacting the other objects for hygienic purposes. Methods of using the same are further provided.

16 Claims, 2 Drawing Sheets

HOOK APPARATUS AND METHODS OF USING THE SAME

TECHNICAL FIELD

The present invention relates to a hook apparatus. Specifically, the hook apparatus comprises a loop structural element having a hook element extending therefrom that may be used for alternatively pushing, pulling, twisting, grabbing, holding or otherwise manipulating other objects without contacting the other objects for hygienic purposes. Methods of using the same are further provided.

BACKGROUND

It is, of course, generally known for individuals to manually manipulate objects using their hands. Indeed, a person's hands are uniquely structured to allow an individual to handle, grab or otherwise manipulate objects in the environment. Hands have individually articulating fingers that may be used for grabbing, holding and pulling, a palm section that may be used for pushing, and a wrist element that may be used, in conjunction with the articulating fingers and palm section, for twisting and grabbing objects. For example, an individual having full motor control of his or her hand may easily grasp a door handle, twist the door handle, pull the door handle, and/or push the door handle as needed.

A person's hand is covered by a protective layer of skin. However, the layer of skin may come into contact with pathogens in the environment. Indeed, since an individual's hands are primarily used for manipulating objects in the environment, they tend to frequently contact pathogens in the environment. In our quest to create sterile environments, however, with the use of chemical cleansers and sterilizers, pathogens are becoming stronger and stronger, and people are becoming more susceptible to contracting diseases.

People are further more prone to contracting diseases if there are openings in the protective skin layer, such as from cuts, sores, rashes, or other like skin conditions. Moreover, certain individuals, such as children or the elderly, may have compromised immune systems that may make them more susceptible to contracting diseases. Thus, an individual may find it necessary to minimize or even eliminate direct skin contact with objects or items in the environment. A need, therefore, exists for apparatuses that may minimize or eliminate a user's contact with items or objects in the environment. More specifically, a need exists for apparatuses that a user may utilize to manipulate items or objects in the environment without resulting in skin to item or object contact.

Heretofore, solutions have included the use of gloves, such as rubber gloves, or other gloves that a user may wear to create a further protective layer between a user's skin and the item or object. However, gloves can be unwieldy and difficult to use to manipulate an object. Moreover, rubber gloves can be or become uncomfortable, and may cause sweating, pain, and even rashes from allergic reactions. A need, therefore, exists for apparatuses to allow users to manipulate items or objects in the environment without pain or discomfort. Moreover, a need exists for apparatus to allow users to manipulate items or objects in the environment without causing sweating or allergic reactions caused by rubber gloves or other like objects.

Still further, other solutions include hand-held objects that can be used to manipulate items or objects. However, typical hand-held objects or apparatuses typically lack strength to be used for both pushing and pulling objects without causing damage to the object. Moreover, hand-held objects typically do not allow for complex manipulation motions, such as grasping or twisting motions. A need, therefore, exists for hand-held apparatuses that may allow for pushing and pulling of items or objects in the environment without causing damage thereto. In addition, a need exists for hand-held apparatuses that allow a user to interact with items or objects in the environment that allow for complex manipulation motions, such as grasping or twisting motions.

SUMMARY OF THE INVENTION

The present invention relates to a hook apparatus. Specifically, the hook apparatus comprises a loop structural element having a hook element extending therefrom that may be used for alternatively pushing, pulling, twisting, grabbing, holding or otherwise manipulating other objects without contacting the other objects for hygienic purposes. Methods of using the same are further provided.

To this end, in an embodiment of the present invention, a hook apparatus for manipulating objects is provided. The hook apparatus comprises a loop portion comprising a ring; and a hook portion comprising a base element extending from the ring of the loop portion and an extended element extending from base element, the extended element comprising a first flat outer surface.

In an embodiment, the hook apparatus further comprises a rounded interior surface formed from the extended element and the base element.

In an embodiment, the rounded interior surface forms an incomplete circle.

In an embodiment, the hook apparatus further comprises a second flat outer surface disposed adjacent to the first flat outer surface and a peak disposed between the first flat outer surface and the second flat outer surface.

In an embodiment, the hook apparatus further comprises first and second shoulders at the transition point between the loop portion and the hook portion.

In an embodiment, the loop portion comprises a ring having an internal aperture.

In an embodiment, the aperture is roughly triangularly shaped.

In an embodiment, the hook apparatus further comprises an aperture disposed in the hook apparatus.

In an embodiment, the aperture holds a keychain ring.

In an embodiment, the hook apparatus is made from a material selected from the group consisting of metal, plastic, wood, and combinations thereof.

In an alternate embodiment of the present invention, a system for manipulating objects is provided. The system comprises the hook apparatus; and an object, wherein the hook apparatus is engaged with the object for moving the object by a user.

In an embodiment, the object is a door handle.

In an alternate embodiment of the present invention, a method of manipulating an object is provided. The method comprises the steps of: providing a hook apparatus comprising a loop portion comprising a ring, and a hook portion comprising a base element extending from the ring of the loop portion and an extended element extending from base element, the extended element comprising a first flat outer surface; holding the hook apparatus in a user's hand; and manipulating an object using the hook apparatus.

In an embodiment, the hook apparatus further comprises a rounded interior surface formed from the extended element and the base element, and the method further comprises the steps of: hooking the extended element in an object so that a portion of the object is disposed on the rounded interior surface; and moving the object with the extended element.

In an embodiment, the hook apparatus further comprises a second flat outer surface disposed adjacent to the first flat outer surface and a peak disposed between the first flat outer surface and the second flat outer surface.

In an embodiment, the hook apparatus further comprises first and second shoulders at the transition point between the loop portion and the hook portion.

In an embodiment, the loop portion of the hook apparatus comprises a ring having an internal aperture, and the method further comprises the step of: grasping the loop portion by placing fingers into the internal aperture.

In an embodiment, the aperture in the loop portion is roughly triangularly shaped.

In an embodiment, the hook apparatus further comprises an aperture disposed in the hook apparatus, and the method further comprises the step of: placing a keychain ring through the aperture.

In an embodiment, the hook apparatus is made from a material selected from the group consisting of metal, plastic, wood, and combinations thereof.

It is, therefore, an advantage and objective of the present invention to provide apparatuses that may minimize or eliminate a user's contact with items or objects in the environment.

More specifically, it is an advantage and objective of the present invention to provide apparatuses that a user may utilize to manipulate items or objects in the environment without resulting in skin to item or object contact.

Moreover, it is an advantage and objective of the present invention to provide apparatuses to allow users to manipulate items or objects in the environment without pain or discomfort.

In addition, it is an advantage and objective of the present invention to provide apparatuses to allow users to manipulate items or objects in the environment without causing sweating or allergic reactions caused by rubber gloves or other like objects.

Further, it is an advantage and objective of the present invention to provide hand-held apparatuses that may allow for pushing and pulling of items or objects in the environment without causing damage thereto.

Still further, it is an advantage and objective of the present invention to provide hand-held apparatuses that allow a user to interact with items or objects in the environment that allow for complex manipulation motions, such as grasping or twisting motions.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a hook apparatus. Specifically, the hook apparatus comprises a loop structural element having a hook element extending therefrom that may be used for alternatively pushing, pulling, twisting, grabbing, holding or otherwise manipulating other objects without contacting the other objects for hygienic purposes. Methods of using the same are further provided.

Figure 1:
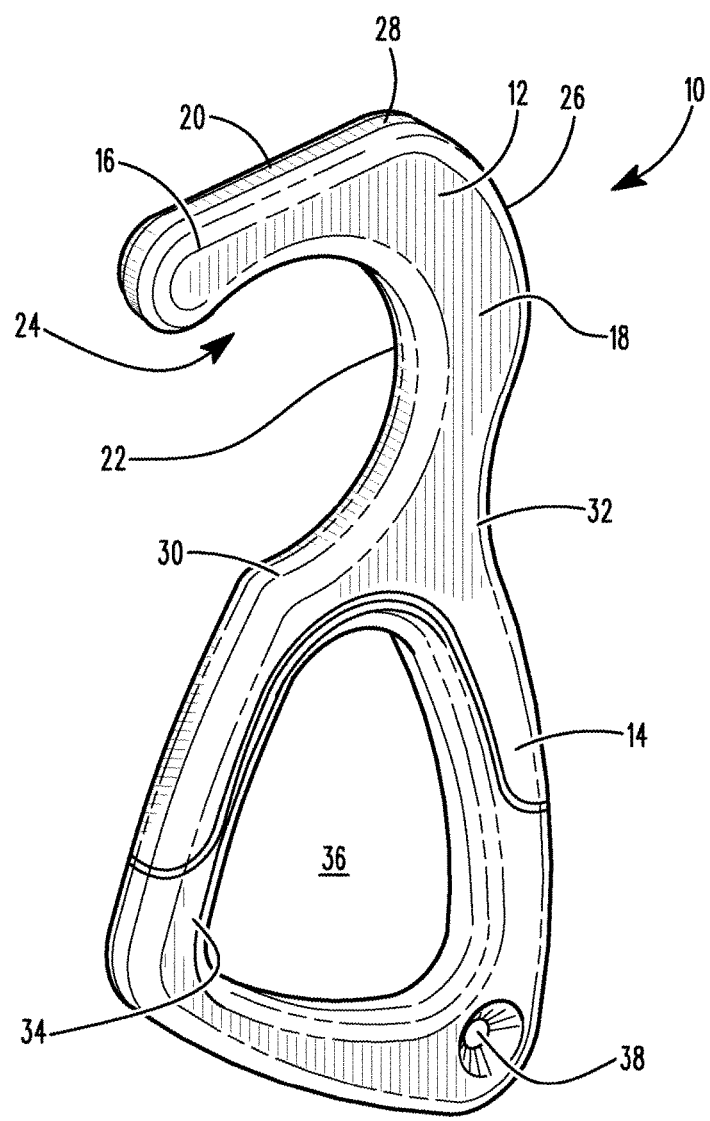
FIG. 1 illustrates a perspective view of a hook apparatus in an embodiment of the present invention.

Now referring to the figures, wherein like numerals refer to like parts, FIG. 1 illustrates a perspective view of a hook apparatus 10 in an embodiment of the present invention. The hook apparatus 10 may be utilized by a user to manipulate items and objects without physically contacting the items. For example, a user may grasp the hook apparatus 10 with his or her hand, and utilize the same to open doors by turning door knobs, pulling doors open, pushing doors closed, or other like actions.

The hook apparatus 10 may comprise a hook portion 12 and a loop portion 14 disposed adjacent the hook portion. Specifically, the hook portion 12 may extend from the loop portion 14. When disposed uprightly, the hook portion 12 may extend from an upper portion of the loop portion 14, in the orientation demonstrated in FIG. 1.

The hook portion 12 may comprise an extended element 16 that may extend from a base element 18. The extended element 16 may comprise a flattened top surface 20 that may extend roughly horizontally from the base element 18, which may extend roughly vertically from the loop portion 14, in an embodiment of the present invention. In a preferred embodiment of the present invention, the extended element 16 may extend at an angularly downward from the base portion 18 when oriented uprightly, as shown in FIG. 1.

The flattened top surface 20 may be utilized as a "pusher". Specifically, a user may grasp the hook apparatus 10, as described below, and push items or objects using the flattened top surface 20. The flattened top surface may extend from an opposite angular or rounded surface 26, having a peak element 28 disposed therebetween. Both the opposite angular or rounded surface 26 and the peak element 28 may be utilized by the user for pushing or otherwise engaging an item or an object.

The hook portion 12 may further comprise an internal rounded surface 22 forming a circular space 24 formed from the extended element 16 and the base element 18. Specifically, the internal rounded surface 22 may preferably form an incomplete circle. A user, when grasping the loop portion 14, as described below, may use the extended element 16 in conjunction with the internal rounded surfaced 22 and circular space 24 for grabbing items or elements and manipulating the same. For example, a user may hook the extended element 16 onto a door handle and pull the door handle upwardly or downwardly to open a door. Of course, the various elements described herein may be utilized by a user in any manner apparent, and the present invention should not be limited as described herein.

The base element 18 may extend through shoulders 30, 32 into the loop portion 14. The loop portion 14 may comprise a ring 34 having an aperture 36 disposed therein. A user may hold the loop portion 14 by grasping the ring 34, with his or her fingers holding the ring 34. For example, a user may use one or more fingers to wrap around the ring 34 and hold the ring securely, with the fingers extending through the aperture 36. The aperture 36 disposed within the ring 34 may preferably be roughly triangularly-shaped, as illustrated in FIG. 1.

Figure 2:
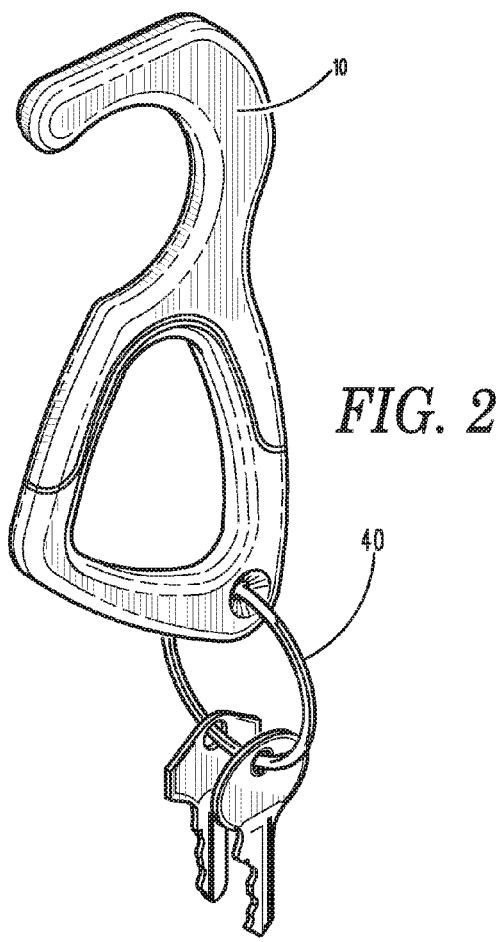
FIG. 2 illustrates a perspective view of a hook apparatus having a keychain attachment in an embodiment of the present invention.

The hook apparatus 10 may further comprise a keychain aperture 38 disposed therein. Preferably, the keychain aperture 38 may be disposed in the loop portion 14, and may contain a keychain ring with a set of keys 40, as illustrated in FIG. 2. Of course, the keychain aperture 38 may hold other items therein, such as a ring that may hold items such as utility folding knives, flashlights, safety alarms, self-defense spray, or other like items that a user may carry.

The hook apparatus 10 may be made from one or more materials to provide rigidity and strength thereto, such as metal, plastic, wood, or other like materials. Moreover, the hook apparatus 10 may comprise elastomeric surfaces that may provide gripping functionality. The elastomeric surfaces may be disposed in certain areas where needed for gripping. Moreover, the hook apparatus 10 may be made from a plastic material having a reinforcing material disposed therein. For example, the hook apparatus may comprise a metal structural element within the hook apparatus, and may be surrounded by a plastic material. Preferably, however, the hook apparatus 10 may be made from a single plastic material that may be easily injection molded during the manufacturing process.

Figure 3A:
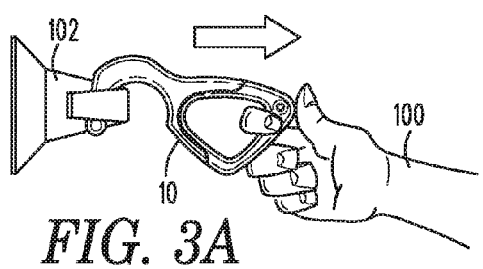
FIGS. 3A-3D illustrates methods of using a hook apparatus in embodiments of the present invention.
Figure 3B:
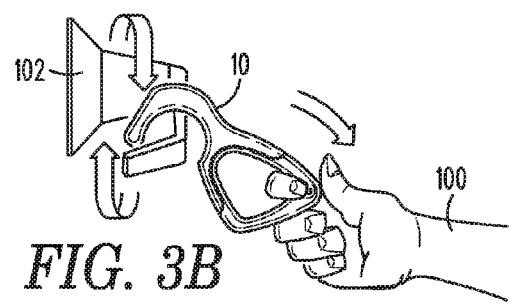
Figure 3C:
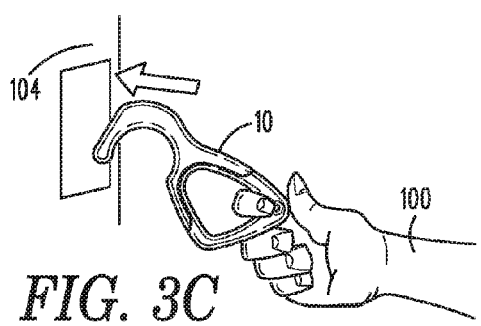
Figure 3D:
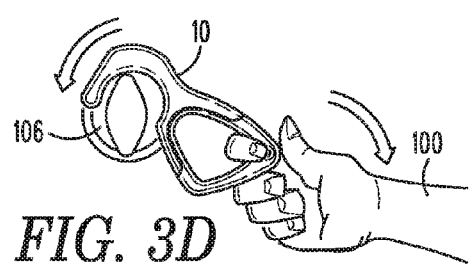

FIGS. 3A-3C illustrate various ways the hook apparatus 10 may be utilized by a user. FIG. 3A illustrates a user 100 grasping the hook apparatus 10 and using it to pull a door knob 102. FIG. 3B illustrates a user 100 grasping the hook apparatus 10 and using it to turn the door knob 102 for opening the same. FIG. 3C illustrates a user 100 grasping the hook apparatus 10 and pushing a door 104 to open the same. Finally, FIG. 3D illustrates a user 100 grasping the hook apparatus 10 and using it to rotate a lock 106 to engage or disengage the lock 106. Of course, FIGS. 3A-3D illustrate exemplary ways to utilize the hook apparatus 10 and should not be limited as described herein.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

I claim:

1. A hook apparatus for manipulating objects comprising:
   a loop portion comprising a ring;
   a hook portion comprising a base element extending from the ring of the loop portion at a first transition point and an extended element extending from base element at a second transition point, the extended element extending from the base element at an acute angle from the base element, the extended element comprising a first flat outer surface running from the second transition point to a terminal end of the extended element;
   first and second shoulders at the first transition point between the loop portion and the hook portion;
   a rounded interior surface formed from the extended element and the base element running from the first shoulder at the first transition point between the loop portion and the hook portion and a terminal end of the extended element, wherein the rounded interior surface forms greater than 180° of a complete circle; and
   an elastomeric material disposed on a surface of the hook apparatus.

2. The hook apparatus of claim 1 further comprising: a second flat outer surface disposed adjacent to the first flat outer surface and a peak disposed between the first flat outer surface and the second flat outer surface.

3. The hook apparatus of claim 1 wherein the loop portion comprises a ring having an internal aperture.

4. The hook apparatus of claim 3 wherein the aperture is roughly triangularly shaped.

5. The hook apparatus of claim 1 further comprising:
   an aperture disposed in the hook apparatus.

6. The hook apparatus of claim 5 wherein the aperture holds a keychain ring.

7. The hook apparatus of claim 1 made from a material selected from the group consisting of metal, plastic, wood, and combinations thereof.

8. A system for manipulating objects comprising:
   the hook apparatus of claim 1; and
   an object, wherein the hook apparatus is engaged with the object for moving the object by a user.

9. The system of claim 8 wherein the object is a door handle.

10. A method of manipulating an object comprising the steps of:
    providing a hook apparatus comprising a loop portion comprising a ring, a hook portion comprising a base element extending from the ring of the loop portion at a first transition point and an extended element extending from base element at a second transition point, the extended element extending from the base element at an acute angle from the base element, the extended element comprising a first flat outer surface running from the second transition point to a terminal end of the extended element, first and second shoulders at the first transition point between the loop portion and the hook portion, a rounded interior surface formed from the extended element and the base element running from the first shoulder at the first transition point between the loop portion and the hook portion and a terminal end of the extended element, wherein the rounded interior surface forms greater than 180° of a complete circle, and an elastomeric material on a surface of the hook apparatus;
    holding the hook apparatus in a user's hand; and
    manipulating an object using the hook apparatus.

11. The method of claim 10 wherein the hook apparatus further comprises a rounded interior surface formed from the extended element and the base element, and further comprising the steps of:
    hooking the extended element in an object so that a portion of the object is disposed on the rounded interior surface; and
    moving the object with the extended element.

12. The method of claim 10 wherein the hook apparatus further comprises a second flat outer surface disposed adjacent to the first flat outer surface and a peak disposed between the first flat outer surface and the second flat outer surface.

13. The method of claim 10 wherein the loop portion of the hook apparatus comprises a ring having an internal aperture, and further comprising the step of:
    grasping the loop portion by placing fingers into the internal aperture.

14. The method of claim 13 wherein the aperture in the loop portion is roughly triangularly shaped.

15. The method of claim 10 wherein the hook apparatus further comprises an aperture disposed in the hook apparatus, and further comprising the step of:

placing a keychain ring through the aperture.

16. The method of claim 10 wherein the hook apparatus is made from a material selected from the group consisting of metal, plastic, wood, and combinations thereof.

* * * * *